US012386280B2

(12) United States Patent
Kajihara et al.

(10) Patent No.: US 12,386,280 B2
(45) Date of Patent: Aug. 12, 2025

(54) TONER

(71) Applicant: CANON KABUSHIKI KAISHA, Tokyo (JP)

(72) Inventors: Hisasuke Kajihara, Ibaraki (JP); Yuya Chimoto, Chiba (JP); Hayato Ida, Ibaraki (JP); Kouichirou Ochi, Chiba (JP); Kazuhisa Shirayama, Tokyo (JP); Masayuki Hama, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 741 days.

(21) Appl. No.: 17/536,853

(22) Filed: Nov. 29, 2021

(65) Prior Publication Data

US 2022/0197174 A1 Jun. 23, 2022

(30) Foreign Application Priority Data

Dec. 17, 2020 (JP) ................................ 2020-209737
Oct. 29, 2021 (JP) ................................ 2021-178220

(51) Int. Cl.
*G03G 9/097* (2006.01)
*G03G 9/08* (2006.01)
*G03G 9/087* (2006.01)

(52) U.S. Cl.
CPC ....... *G03G 9/09791* (2013.01); *G03G 9/0819* (2013.01); *G03G 9/0821* (2013.01); *G03G 9/08755* (2013.01)

(58) Field of Classification Search
CPC ... G03G 9/081; G03G 9/0926; G03G 9/09708
See application file for complete search history.

(56) References Cited

U.S. PATENT DOCUMENTS

| | | | |
|---|---|---|---|
| 6,430,384 | B2 | 8/2002 | Hama et al. |
| 7,135,263 | B2 | 11/2006 | Kawakami et al. |
| 7,833,687 | B2 | 11/2010 | Kato et al. |
| 8,697,327 | B2 | 4/2014 | Shibata et al. |
| 8,921,023 | B2 | 12/2014 | Baba et al. |
| 8,927,188 | B2 | 1/2015 | Naka et al. |
| 9,057,970 | B2 | 6/2015 | Ida et al. |
| 9,348,247 | B2 | 5/2016 | Ida et al. |
| 9,348,253 | B2 | 5/2016 | Kanno et al. |
| 9,540,483 | B2 | 1/2017 | Ida et al. |
| 9,651,883 | B2 | 5/2017 | Hama et al. |
| 9,665,023 | B2 | 5/2017 | Kamae et al. |
| 9,696,644 | B2 | 7/2017 | Ida et al. |
| 9,897,934 | B2 | 2/2018 | Tamura et al. |
| 9,904,190 | B2 | 2/2018 | Dan |
| 10,012,920 | B2 | 7/2018 | Shibata et al. |
| 10,036,970 | B2 | 7/2018 | Kanno et al. |
| 10,078,281 | B2 | 9/2018 | Ida et al. |
| 10,082,743 | B2 | 9/2018 | Hama et al. |
| 10,088,765 | B2 | 10/2018 | Miyakai et al. |
| 10,146,146 | B2 | 12/2018 | Komatsu et al. |
| 10,175,595 | B2 | 1/2019 | Onozaki et al. |
| 10,197,936 | B2 | 2/2019 | Onozaki et al. |
| 10,203,619 | B2 | 2/2019 | Yamashita et al. |
| 10,228,629 | B2 | 3/2019 | Tamura et al. |
| 10,274,851 | B2 | 4/2019 | Hashimoto et al. |
| 10,353,312 | B2 | 7/2019 | Kamae et al. |
| 10,401,748 | B2 | 9/2019 | Hashimoto et al. |
| 10,423,086 | B2 | 9/2019 | Hama et al. |
| 10,451,986 | B2 | 10/2019 | Sano et al. |
| 10,451,990 | B2 | 10/2019 | Kamae et al. |
| 10,474,049 | B2 | 11/2019 | Onozaki et al. |
| 10,514,624 | B2 | 12/2019 | Tamura et al. |
| 10,564,560 | B2 | 2/2020 | Onozaki et al. |
| 10,599,060 | B2 | 3/2020 | Kanno et al. |
| 10,656,545 | B2 | 5/2020 | Kamae et al. |
| 10,775,710 | B1 | 9/2020 | Kamae et al. |
| 10,859,931 | B2 | 12/2020 | Hashimoto et al. |
| 10,877,386 | B2 | 12/2020 | Murayama et al. |
| 10,969,705 | B2 | 4/2021 | Shirayama et al. |
| 11,029,617 | B2 | 6/2021 | Chimoto et al. |
| 11,112,711 | B2 | 9/2021 | Ochi et al. |
| 11,131,939 | B2 | 9/2021 | Hama et al. |
| 11,181,848 | B2 | 11/2021 | Ochi et al. |
| 2012/0003580 | A1 | 1/2012 | Hama et al. |
| 2013/0108955 | A1 | 5/2013 | Shibata et al. |
| 2014/0134535 | A1 | 5/2014 | Baba et al. |

(Continued)

FOREIGN PATENT DOCUMENTS

| | | |
|---|---|---|
| CN | 104204960 A | 12/2014 |
| CN | 109976116 A | 7/2019 |

(Continued)

OTHER PUBLICATIONS

Translation of JP 2015-194667.*
Li, Hong-kui et al., The Research of High Whiteness Electrophotographic Paper, pp. 27-30, 1994-2023, China Academic Journal Electronic Publishing Home, College of the Pulp and Paper Engineering, Shaanxi University of Science & Technology.
U.S. Appl. No. 17/457,766, Yuya Chimoto, filed Dec. 6, 2021.
U.S. Appl. No. 17/457,822, Hisasuke Kajihara, filed Dec. 6, 2021.
U.S. Appl. No. 17/542,006, Masaharu Miura, filed Dec. 3, 2021.
U.S. Appl. No. 17/648,330, Hiroki Watanabe, filed Jan. 19, 2022.
U.S. Appl. No. 17/648,333, Ichiro Kanno, filed Jan. 19, 2022.
U.S. Appl. No. 17/648,368, Ichiro Kanno, filed Jan. 19, 2022.

*Primary Examiner* — Peter L Vajda
(74) *Attorney, Agent, or Firm* — VENABLE LLP

(57) ABSTRACT

A toner having high rub resistance is provided. A toner including a toner particle containing a binder resin and a calcium carbonate particle, wherein in X-ray diffractometry of the toner particle by CuKα radiation, when the Bragg angle is defined as θ, (i) the calcium carbonate particle has peaks at 2θ of 26.5°±0.5° and 29.5°±0.5°, (ii) a crystallite diameter of crystals thereof attributed to 2θ=29.5°±0.5° is 10 nm or more and 45 nm or less, and (iii) the ratio (a/b) of a peak intensity "a" at 2θ=26.5°±0.5° to a peak intensity "b" at 2θ=29.5°±0.5° is 0.15 or more and 0.24 or less.

8 Claims, No Drawings

(56) References Cited

U.S. PATENT DOCUMENTS

| | | | |
|---|---|---|---|
| 2014/0363209 | A1 | 12/2014 | Inoue |
| 2015/0099227 | A1 | 4/2015 | Ida et al. |
| 2017/0315463 | A1 | 11/2017 | Onozaki et al. |
| 2018/0307153 | A1 | 10/2018 | Kanno et al. |
| 2018/0314176 | A1 | 11/2018 | Ikeda et al. |
| 2019/0155182 | A1 | 5/2019 | Watanabe et al. |
| 2020/0310273 | A1 | 10/2020 | Chimoto et al. |
| 2020/0409284 | A1 | 12/2020 | Matsubara et al. |
| 2020/0409285 | A1 | 12/2020 | Tokunaga et al. |
| 2021/0080848 | A1 | 3/2021 | Tsuchida et al. |
| 2021/0141315 | A1 | 5/2021 | Kamae et al. |
| 2021/0181647 | A1 | 6/2021 | Hashimoto et al. |
| 2021/0181649 | A1 | 6/2021 | Kanno et al. |
| 2021/0181650 | A1 | 6/2021 | Hama et al. |
| 2021/0181651 | A1 | 6/2021 | Kanno et al. |
| 2021/0278774 | A1 | 9/2021 | Hashimoto et al. |
| 2021/0278775 | A1 | 9/2021 | Kamae et al. |

FOREIGN PATENT DOCUMENTS

| | | | | |
|---|---|---|---|---|
| JP | 8-339095 A | | 12/1996 | |
| JP | 2012-83497 A | | 4/2012 | |
| JP | 2013200559 A | | 10/2013 | |
| JP | 2014-109582 A | | 6/2014 | |
| JP | 2015-194667 | * | 11/2015 | ............... G03G 9/08 |
| JP | 2016-114828 A | | 6/2016 | |
| JP | 6089726 B2 | | 3/2017 | |
| JP | 6535988 B2 | | 7/2019 | |

* cited by examiner

TONER

BACKGROUND OF THE INVENTION

Field of the Invention

The present disclosure relates to a toner used in an electrophotographic image forming method.

Description of the Related Art

Recently, electrophotographic full-color copiers have been widely spread, and applications to the printing market have also been started. In the printing market, there has been a demand for high speed, high image quality, and high productivity while a broad range of media (paper type) is treated. For example, there has been a demand for medium constant velocity indicating that printing can be continued without changing the process speed or the heat setting temperature of the fixing apparatus according to the paper type even if the paper type changes from a thick sheet of paper to a thin sheet of paper.

From the viewpoint of the medium constant velocity required, fixing should be appropriately completed by the toner in a wide range of fixing temperature from low to high temperatures. For example, to provide compatibility between low-temperature fixing properties and hot offset resistance, toners are proposed in which calcium carbonate is added to toner particles to use the internal cohesive force of calcium carbonate (Japanese Patent Nos. 6535988 and 6089726, Japanese Patent Application Laid-Open Nos. 2016-114828 and H08-339095).

SUMMARY OF THE INVENTION

In some cases, migration of the toner might occur in portions having a low image density due to rubbing (hereinafter, the resistance against toner migration is referred to as "rub resistance"), even though the toner having improved low-temperature fixing properties is fixed at an image density of 100%, thus improvement in rub resistance may not be improved only by improving low-temperature fixing properties. Furthermore, the rub resistance still has room for examination from the viewpoint of high image quality.

An object of the present disclosure is to provide a toner which can solve the problem above and improve rub resistance.

The present disclosure relates to a toner including a toner particle containing a binder resin and a calcium carbonate particle, wherein in X-ray diffractometry of the toner particle by CuKα radiation, when the Bragg angle is defined as θ, (i) the calcium carbonate particle has peaks at 2θ of 26.5°±0.5° and 29.5°±0.5°, (ii) a crystallite diameter of crystals thereof attributed to 2θ=29.5°±0.5° is 10 nm or more and 45 nm or less, and (iii) a ratio (a/b) of a peak intensity "a" at 2θ=26.5°±0.5° to a peak intensity "b" at 2θ=29.5°±0.5° is 0.15 or more and 0.24 or less.

Further features of the present disclosure will become apparent from the following description of exemplary embodiments.

DESCRIPTION OF THE EMBODIMENTS

The configuration of a preferred toner according to the present disclosure will now be described in detail. The expressions indicating numeric value ranges, such as "XX or more and YY or less" and "XX to YY", represent numeric value ranges including the lower limit and upper limit as ends, unless otherwise specified.

The toner according to the present disclosure is a toner including a toner particle containing a binder resin and a calcium carbonate particle, wherein in X-ray diffractometry of the toner particle by CuKα radiation, when the Bragg angle is defined as θ, (i) the calcium carbonate particle has peaks at 2θ of 26.5°±0.5° and 29.5°±0.5°, (ii) the crystallite diameter of crystals thereof attributed to 2θ=29.5°±0.5° is 10 nm or more and 45 nm or less, and (iii) a ratio (a/b) of a peak intensity "a" at 2θ=26.5°±0.5° to a peak intensity "b" at 2θ=29.5°±0.5° is 0.15 or more and 0.24 or less.

Use of such a configuration can provide a toner having improved low-temperature fixing properties while providing high rub resistance of images.

The present inventors consider the following mechanism how rub resistance is improved by the toner according to the present disclosure having a characteristic configuration.

To improve rub resistance, it is important to provide a state where the toner when rubbed is fixed without broken. While addition of calcium carbonate increases interaction with the binder resin and thus improves rub resistance, there are some insufficient cases yet. Accordingly, the present inventors, who have conducted further research, successfully provided low-temperature fixing properties compatible with rub resistance by further enhancing the interaction with the binder resin per one calcium carbonate particle. Although a specific mechanism has not been established yet, the present inventors infer the followings.

Calcium carbonate contains a (104) plane and a (112) plane as crystallite planes. For the (112) plane, the crystal phase peak in X-ray diffractometry (XRD) is detected at 2θ=26.5°±0.5°. For the (104) plane, the crystal phase peak in XRD is detected at 2θ=29.5°±0.5°.

Disintegration of a flat (104) plane results in remarkable surface roughness, and a highly active structure called step appears. It is believed that the step has strong interaction with organic molecules, and thus, an increase in step results in strong interaction with the binder resin per one calcium carbonate molecule. In other words, this means that the (104) plane is lost and the step increases if the peak intensity at 2θ=29.5°±0.5°, which indicates the amount of the (104) plane, decreases with respect to the peak intensity at 2θ=26.5°±0.5°, which indicates the amount of the (112) plane. The present inventors infer that in this state, the interaction with the binder resin per one calcium carbonate molecule becomes stronger.

Although the step in the (104) plane of calcium carbonate can be increased by any method, preferably, calcium carbonate is cracked under mechanical stress to expose steps. Examples thereof include a ball mill and solvent milling. Among these, more preferred are methods of increasing steps of the (104) plane by melt kneading calcium carbonate and the binder resin. At this time, it is important to add calcium carbonate in an amount larger than that when conventionally added to the toner. Thereby, the steps of the (104) plane can be interactive with the binder resin. The production method will be described later.

In the calcium carbonate particle, the crystallite diameter of crystals thereof attributed to 2θ=29.5°±0.5° should be 10 nm or more and 45 nm or less in X-ray diffractometry of the toner particle by CuKα radiation. The number of steps of the (104) plane of calcium carbonate increases when the crystallite diameter falls within this range. For this reason, the interaction between the steps of the (104) plane and the binder resin is more strengthened, resulting in an improvement in rub resistance. If the crystallite diameter of crystals thereof attributed to 2θ=29.5°±0.5° is less than 10 nm, such a crystallite diameter is too small to provide calcium carbonate having this value. If the crystallite diameter of crystals thereof attributed to 2θ=29.5°±0.5° is more than 45 nm, the number of steps of the (104) plane is reduced, and the effects of the present disclosure cannot be ensured. To further enhance the effects of the present disclosure, the crystallite diameter is more preferably 20 nm or more and 40 nm or less.

In the calcium carbonate particle, the ratio of the peak intensity of crystals thereof attributed to 2θ=26.5°±0.5° to the peak intensity of crystals thereof attributed to 2θ=29.5°±0.5° should be 0.15 or more and 0.24 or less in X-ray diffractometry of the toner particle by CuKα radiation. This ratio indicates a ratio "a/b" where the peak intensity of crystals thereof attributed to 2θ=26.5°±0.5° is defined as a and the peak intensity of crystals thereof attributed to 2θ=29.5°±0.5° is defined as b. If the ratio of intensity falls within this range, the steps in the (104) plane of calcium carbonate interact with the binder resin to improve the rub resistance.

The ratio of the peak intensity is more preferably 0.15 or more and 0.20 or less.

The configurations of preferred materials will now be described.

<Calcium Carbonate Particle>

It is important that the toner particle according to the present disclosure contains a calcium carbonate particle. The interaction of the steps in the (104) plane of calcium carbonate and the binder resin can increase the toner cohesive force to maintain the fixing state even if calcium carbonate is used in a small content. For this reason, compatibility between low-temperature fixing properties and rub resistance can be achieved. Because the step of the (104) plane is needed, calcium carbonate is needed.

A variety of calcium carbonates conventionally known can be used as long as they are calcium carbonate. Examples thereof include light calcium carbonate, colloidal calcium carbonate, and heavy calcium carbonate.

In a cross section of the toner observed with a transmission electron microscope, the calcium carbonate particle preferably has the number average particle diameter of 0.1 μm or more and 5.0 μm or less. If the particle diameter of the calcium carbonate particle falls within this range, a cohesive force is increased by the interaction between the steps of the (104) plane and the binder resin to improve the rub resistance. The calcium carbonate particle more preferably has a particle diameter of 0.2 μm or more and 0.7 μm or less.

In a cross section of the toner observed with a transmission electron microscope, the calcium carbonate particle preferably has an average aspect ratio (long axis/short axis) of 1.5 or more and 6.0 or less. If the average aspect ratio (long axis/short axis) of the calcium carbonate particle falls within this range, a cohesive force is increased by the interaction between the steps of the (104) plane and the binder resin to improve the rub resistance. The calcium carbonate particle more preferably has an average aspect ratio (long axis/short axis) of 2.0 or more and 2.5 or less.

The content of the calcium carbonate particle in the toner particle is preferably 3.0% by mass or more and 40% by mass or less. If the content of the calcium carbonate particle in the toner particle falls within this range, the interaction between the step of the (104) plane and the binder resin can be effectively demonstrated, improving the rub resistance. The content of the calcium carbonate particle in the toner particle is more preferably 10 to 33% by mass.

<Binder Resin>

The toner particle according to the present disclosure contains a binder resin. Any known polymer can be used as the binder resin, and specifically the following polymers can be used, for example.

Examples thereof include styrene and homopolymers of substituted products thereof, such as polystyrene, poly-p-chlorostyrene, and polyvinyltoluene; styrene copolymers such as styrene-p-chlorostyrene copolymers, styrene-vinyltoluene copolymers, styrene-vinylnaphthalene copolymers, styrene-acrylic acid ester copolymers, styrene-methacrylic acid ester copolymers, styrene-α-chloromethyl methacrylate copolymers, styrene-acrylonitrile copolymers, styrene-vinyl methyl ether copolymers, styrene-vinyl ethyl ether copolymers, styrene-vinyl methyl ketone copolymers, and styrene-acrylonitrile-indene copolymers; polyvinyl chloride, phenol resins, natural resin-modified phenol resins, natural resin-modified maleic acid resins, acrylic resins, methacrylic resins, polyvinyl acetate, silicone resins, polyester resins, polyurethane resins, polyamide resins, furan resins, epoxy resins, xylene resins, poly(vinyl butyral), terpene resins, coumarone-indene resins, and petroleum resins. These resins may be used singly or two or more resins can be used in combination. Among these, amorphous polyester resins are preferred from the viewpoint of rub resistance because they are more interactive with the step in the (104) plane of calcium carbonate.

The binder resin may contain a crystalline polyester resin. The crystalline polyester resin is more interactive with the step in the (104) plane of calcium carbonate and is preferable from the viewpoint of rub resistance. The crystalline polyester resin is preferably a condensation polymerized product of an alcohol containing an aliphatic diol having 2 or more and 23 or less carbon atoms with a carboxylic acid containing an aliphatic dicarboxylic acid having 3 or more and 24 or less carbon atoms.

The crystalline polyester resin is more preferably a condensation polymerized product of an alcohol containing 80 mol % or more and 100 mol % or less (more preferably 85 mol % or more and 100 mol % or less) of an aliphatic diol having 4 or more and 12 or less carbon atoms in the total alcohols constituting the crystalline polyester resin with a carboxylic acid containing 80 mol % or more and 100 mol % or less (more preferably 85 mol % or more and 100 mol % or less) of an aliphatic dicarboxylic acid having 4 or more and 20 or less carbon atoms in the total carboxylic acids constituting the crystalline polyester resin.

The aliphatic diol is preferably a linear aliphatic diol. Examples thereof can include 1,4-butanediol, 1,5-pentanediol, 1,6-hexanediol, 1,7-heptanediol, 1,8-octanediol, 1,9-nonanediol, 1,10-decanediol, 1,12-dodecanediol, and derivatives thereof. The derivatives can be any one that provides the same resin structure through condensation polymerization without limitation. Examples thereof include derivatives of the diol subjected to esterification.

The aliphatic dicarboxylic acid is preferably a linear aliphatic dicarboxylic acid. Examples thereof include malonic acid, succinic acid, glutaric acid, adipic acid, pimelic acid, suberic acid, glutaconic acid, azelaic acid, sebacic acid, hexadecane diacid, eicosane diacid, and derivatives thereof. The derivatives can be any one that provides the same resin structure through condensation polymerization without limitation. Examples thereof include derivatives of acid anhydrides of the dicarboxylic acids and dicarboxylic acid components subjected to alkyl esterification or acid chlorination.

On the other hand, the carboxylic acid can also be used in combination with a carboxylic acid other than the aliphatic dicarboxylic acid.

The content of the crystalline polyester resin is preferably 0.1 to 5.0% by mass, more preferably 1.0 to 4.0% by mass relative to the toner particle. If the content of the crystalline polyester resin falls within this range, the interaction with the step in the (104) plane of calcium carbonate can be effectively demonstrated, contributing to an improvement in rub resistance.

<Colorant>

The toner particle may contain a colorant. Examples of the colorant include known organic pigments or oily dyes, carbon black, or magnetic substances.

Examples of cyan colorants include copper phthalocyanine compounds and derivatives thereof, anthraquinone compounds, and basic dye lake compounds. Specifically, examples thereof include C.I. Pigment Blues 1, 7, 15, 15:1, 15:2, 15:3, 15:4, 60, 62, and 66.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds, and perylene compounds. Specifically, examples thereof include C.I. Pigment Reds 2, 3, 5, 6, 7, 23, 48:2, 48:3, 48:4, 57:1, 81:1, 122, 144, 146, 166, 169, 177, 184, 185, 202, 206, 220, 221, and 254, and C.I. Pigment Violet 19.

Examples of yellow colorants include condensed azo compounds, isoindolinone compounds, anthraquinone compounds, azo metal complexes, methine compounds, and allyl amide compounds. Specifically, examples thereof include C.I. Pigment yellows 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, and 194.

Examples of black colorants include carbon black, magnetic substances, or the yellow colorants, the magenta colorants, and the cyan colorants controlled to be black. These colorants may be used singly or two or more may be used by mixing. These can also be used in the form of a solid solution.

The colorant may be selected from the viewpoint of the hue angle, saturation, lightness, lightfastness, OHP transparency, and dispersibility to the toner particle.

The content of the colorant is preferably 1 part by mass or more and 20 parts by mass or less relative to 100 parts by mass of the binder resin.

<Mold Release Agent>

The toner particle may contain a mold release agent. Examples of the mold release agent include the followings: low molecular weight polyolefins such as polyethylene; silicones having a melting point; fatty acid amides such as oleamide, erucamide, ricinoleamide, and stearamide; ester waxes such as stearyl stearate; plant-derived waxes such as carnauba wax, rice wax, candelilla wax, Japan wax, and jojoba oil; animal-derived waxes such as beeswax; mineral and petroleum waxes such as montan wax, ozokerite, ceresin, paraffin wax, microcrystalline wax, Fischer-Tropsch wax, ester wax; and modified products thereof.

These mold release agents may be used singly or two or more may be used by mixing.

The melting point of the mold release agent is preferably 150° C. or less, more preferably 40° C. or more and 130° C. or less, still more preferably 40° C. or more and 110° C. or less.

The content of the mold release agent is preferably 1 part by mass or more and 30 parts by mass or less relative to 100 parts by mass of the binder resin.

<Production Method>

The procedure of producing the toner according to the present disclosure will be described.

Any production method for the toner can be used without limitation, and known methods such as emulsion agglomeration, pulverization, and suspension polymerization can be used.

The method of producing the toner according to the present disclosure involves step 1 of melt kneading a first mixture containing a portion of the binder resin and calcium carbonate particle with a twin-screw extruder to prepare a melted mixture, and step 2 of melt kneading a second mixture containing the melted mixture and the residual binder resin.

Specifically, the method of producing the toner according to the present disclosure is preferably a toner production method involving steps 1 and 2 below.

<Step 1>

The step 1 is a step of increasing steps in the (104) plane of calcium carbonate.

In a raw material mixing step, predetermined amounts of the binder resin, calcium carbonate, the colorant particle and the like are weighed, and are mixed. Examples of a mixing apparatus include, but should not be limited to, a Henschel mixer (available from NIPPON COKE & ENGINEERING CO., LTD.); SUPERMIXER (available from KAWATA MFG Co., Ltd.); Ribocone (available from Okawara Mfg. Co., Ltd.); Nauta Mixer, Turburizer, and Cyclomix (available from Hosokawa Micron Corporation); a spiral pin mixer (available from Pacific Machinery & Engineering Co., Ltd.); and a Loedige mixer (available from MATSUBO Corporation). The mixture prepared in this mixing apparatus is defined as first mixture.

Next, the first mixture is melt kneaded with a twin-screw extruder. At this time, the (104) plane of the calcium carbonate particle can be reduced and the steps (active plane) can be increased by rubbing calcium carbonate particle with each other or by rubbing the calcium carbonate particle with other materials such as the colorant particle. In addition, a high shear force is needed to further increase the steps. For this reason, a high viscosity is needed in the step 1. Then, interaction is demonstrated between the steps and the binder resin. Here, the melt kneaded product produced in the step 1 is defined as "the calcium carbonate particle dispersed product".

When the content of the binder resin is defined as Mr (% by mass) and the content of the calcium carbonate particle is defined as Mi (% by mass) relative to the mass of the first mixture in the step 1, Mr and Mi preferably satisfy the relations represented by:

$$15 \leq Mr \leq 75$$

$$0.17 \leq Mi/Mr \leq 1.3.$$

The reason is because if the contents fall within these ranges, the (104) plane of the calcium carbonate particle can be reduced and the steps (active plane) can be increased by rubbing calcium carbonate particle with each other or by rubbing the calcium carbonate particle with the colorant particle.

Examples of the melt kneading apparatus include, but should not be limited to, a batch type kneader such as a pressure kneader and a Banbury mixer, and a TEM extruder (available from TOSHIBA MACHINE CO., LTD.); a TEX twin-screw kneader (available from The Japan Steel Works, Ltd.); a PCM kneader (available from Ikegai Corp.); and Kneadex (available from Mitsui Mining Co., Ltd.). Due to advantages such as continuous production, a continuous kneader such as a single or twin-screw extruder is preferred to a batch type kneader. In addition, the circumferential speed of an outer end of the kneading screw is desirably 78 mm/s or more. The circumferential speed is defined as a distance of one point of the outer end of the kneading screw of the extruder which travels for 1 second. The circumferential speed is determined from the expression, i.e., the screw diameter (mm)×pi×the number of rotations (rpm)/60. If the circumferential speed falls within this range, the (104) plane of calcium carbonate particle can be reduced and the step (active plane) can be increased.

The calcium carbonate particle dispersed product prepared through melt kneading is rolled with a two-roll or the like after melt kneading, and is cooled through a cooling step of cooling with water or the like.

The cooled product of the calcium carbonate particle dispersed product prepared above is then crushed into a desired particle diameter in a pulverizing step. In the pulverizing step, first, the product is roughly crushed with a crusher, a hammer mill, or a feather mill, and is further pulverized with a CRYPTRON system (available from Kawasaki Heavy Industries, Ltd.) or a super rotor (available from NISSHIN ENGINEERING INC.) to prepare fine calcium carbonate particle dispersed product. The fine calcium carbonate particle dispersed product is defined as the second mixture.

<Step 2>

The step 2 is a step of preparing a toner using the second mixture prepared in the step 1.

In a raw material mixing step, predetermined amounts of the second mixture, the binder resin, a hydrocarbon wax and the like as toner raw materials are weighed, and are mixed. Examples of the mixing apparatus include, but should not limited to, a Henschel mixer (available from NIPPON COKE & ENGINEERING CO., LTD.); SUPERMIXER (available from KAWATA MFG Co., Ltd.); Ribocone (available from Okawara Mfg. Co., Ltd.); Nauta Mixer, Turburizer, and Cyclomix (available from Hosokawa Micron Corporation); a spiral pin mixer (available from Pacific Machinery & Engineering Co., Ltd.); and a Loedige mixer (available from MATSUBO Corporation). In the step 2, the content of the residual binder resin additionally added is desirably 30% by mass or more and 75% by mass or less relative to the mass of the second mixture. If the content falls within this range, the interaction between calcium carbonate having a large amount of steps and the binder resin contained in the second mixture appropriately acts, improving the rub resistance.

Next, the toner raw material containing the second mixture is melt kneaded with a twin-screw extruder. In the melt kneading step, a batch type kneader such as a pressure kneader or a Banbury mixer or a continuous kneader can be used. Due to advantages such as continuous production, a single- or twin-screw extruder is preferred. The melt kneading temperature is preferably about 100 to 200° C.

<Pulverizing Step>

The pulverizing step is a step of cooling the resulting kneaded product to a crushable hardness after the steps 1 and 2, and mechanically pulverizing the product into a toner particle diameter with a known mill such as an impact plate jet mill, a fluid layer jet mill, or a rotary mechanical mill. From the viewpoint of pulverizing efficiency, use of a fluid layer jet mill as a mill is desired.

Examples of the mill include Counter Jet Mill, Micron Jet, and Inomizer (available from Hosokawa Micron Corporation); IDS mill and PJM jet mill (available from Nippon Pneumatic Mfg. Co., Ltd.); a cross jet mill (available from Kurimoto, Ltd.); ULMAX (available from NISSO ENGINEERING CO., LTD.); SK Jet-O-Mill (available from Seishin Enterprise Co., Ltd.); CRYPTRON (available from Kawasaki Heavy Industries, Ltd.); a turbo mill (available from FREUND-TURBO CORPORATION); and a super rotor (available from NIS SHIN ENGINEERING INC.).

<Classification Step>

The classification step is a step of classifying the resulting pulverized product in the pulverizing step above to prepare toner particle having a desired grain size distribution.

The classifier to be used in classification can be a known apparatus such as an air force classifier, an inertial classifier, or a sieve type classifier. Specifically, examples thereof include Crushiel, Micron Classifier, and Spedic Classifier (available from Seishin Enterprise Co., Ltd.); Turbo Classifier (available from NIS SHIN ENGINEERING INC.); a micron separator, Turboplex (ATP), a TSP separator (available from Hosokawa Micron Corporation); an elbow jet (available from Nittetsu Mining Co., Ltd.), a dispersion separator (available from Nippon Pneumatic Mfg. Co., Ltd.); and YM Microcut (available from YASKAWA SHOJI CO., LTD.).

To the toner particle prepared through the steps above, inorganic fine particles such as silica, alumina, or titania and resin fine particles such as a vinyl resin, a polyester resin, and a silicone resin in dryness may be added as required, while a shear force is applied. These inorganic fine particles and resin fine particles function external additives such as a fluidity aid or a cleaning aid.

The toner according to the present disclosure has a weight average particle diameter of preferably 3.0 μm or more and 20.0 μm or less, more preferably 4.0 or more and 10.0 μm or less.

EXAMPLES

Hereinafter, the present disclosure will be described in more detail by way of Examples and Comparative Examples, but these should not be construed as limitations to the present disclosure. Note that when "part" is simply stated, it means "part by mass".

A variety of physical properties related with the present disclosure were measured by the following measurement methods.

<Method of Separating Toner Particle from Toner>

160 g of sucrose (available from KISHIDA CHEMICAL Co., Ltd.) is added to 100 mL of deionized water, and is dissolved while the container is placed in hot water, thereby preparing a dense sucrose solution. 31 g of the dense sucrose solution and 6 mL of CONTAMINON N (nonionic surfactant, a 10% by mass aqueous solution of a neutral detergent (pH: 7) for washing a precise measurement apparatus, which contains an anionic surfactant and an organic builder, available from Wako Pure Chemical Industries, Ltd.) are placed into a centrifugation tube to prepare a dispersion. 1.0 g of toner is added to the dispersion, and lumps of the toner are loosened with a spatula. Next, the centrifugation tube is shaken with a shaker. After shaking, the solution is transferred to a glass tube (50 mL) for a swing rotor, and is separated with a centrifuge at 3500 rpm for 30 minutes.

Through this operation, toner particles are separated from detached external additives. After sufficient separation of the toner particles from the aqueous solution is visually observed, the toner particles are collected, and are filtered through a reduced pressure filter, followed by drying with a dryer for 1 hour or longer to give toner particles (filtered product 1) from which external additives are separated.

<Method of Measuring Content of Calcium Carbonate>

The filtered product 1 is immersed in 0.1 mol/L hydrochloric acid, and is ultrasonically treated for 10 minutes. Thereafter, the filtered product 1 is left to stand for 3 hours. The resulting solution is filtered to give a filtered product 2. Because calcium carbonate reacts with hydrochloric acid and dissolves therein, the content Mc of calcium carbonate is measured by measuring the difference in mass between filtered product 2 and filtered product 1.

<Method of Measuring Aspect Ratio of Calcium Carbonate Particle>

A cross section of the toner can be observed with a scanning electron microscope and the aspect ratio of calcium carbonate particle can be evaluated by cross sectional observation as follows.

By observing a cross section of the toner, calcium carbonate particle can be obtained as a clear contrast.

A cross section of toner particle can be prepared by placing the toner particle on a carbon tape, and sputtering PtPd thereonto for 60 seconds, followed by scraping with irradiation with an argon ion beam. The cross sectional image of the toner particle is captured by a back-scattered electron image capturing method with a Hitachi ultra-high resolution electric field emission scanning electron microscope S-4800 (Hitachi High-Technologies Corporation). The calcium carbonate particle in the cross sectional image of the toner particle is specified using an energy dispersive X-ray spectroscopic analyzer (EDAX) or the like.

The aspect ratio of a calcium carbonate particle is defined as a ratio of the long diameter to a short diameter of a calcium carbonate particle. The long diameter of the calcium carbonate particle can be determined by measuring the length in the longitudinal direction (length of the long side) when the calcium carbonate particle is considered as a cube. The short diameter of the calcium carbonate particle can be determined by measuring the length in the lateral direction (length of the short side) when the calcium carbonate particle is considered as a cuboid. The aspect ratio above is measured for 100 calcium carbonate particles, and the average is defined as aspect ratio.

<Method of Measuring Weight Average Particle Diameter (D4) of Toner Particle>

The weight average particle diameter (D4) of the toner particle is measured with a precise particle size distribution analyzer "Coulter Counter Multisizer 3" (registered trademark, available from Beckman Coulter, Inc.) including a 50 μm aperture tube by a pore electric resistance method and dedicated software "Beckman Coulter Multisizer 3 Version 3.51" (available from Beckman Coulter, Inc.) attached thereto to set the measurement condition and analyze the measured data where the number of effective measurement channels is 25000 channels, followed by analysis of the measured data and then calculation.

The electrolytic aqueous solution to be used for the measurement can be those prepared by dissolving super grade sodium chloride in deionized water to have a concentration of about 1% by mass, for example, "ISOTON II" (available from Beckman Coulter, Inc.).

Prior to measurement and analysis, the dedicated software is set as follows.

In the "screen for changing standard measurement method (SOM)" of the dedicated software, the total count in the control mode is set to 50000 particles, the number of measurements is set to one time, and the Kd value is set to a value obtained using "standard particle 10.0 μm" (available from Beckman Coulter, Inc.). The threshold and the noise level are automatically set by pressing a button for measuring a threshold/noise level. The current is set to 1600 μA, the gain is set to 2, the electrolyte solution is set to ISOTON II, and flush of the aperture tube after measurement is checked.

In the "setting screen for conversion from pulse to particle diameter" of the dedicated software, the bin interval is set to the logarithmic particle diameter, the particle diameter bin is set to 256 particle diameter bins, and the particle diameter range is set to 1 μm or more and 30 μm or less.

Specific measurement methods are described as follows.

(1) About 200 ml of the electrolytic aqueous solution is placed into 250 ml round-bottomed glass beaker dedicated to Multisizer 3. The beaker is set on a sample stand, and stirring is performed counterclockwise with a stirrer rod at 24 rotations/seconds. Fouling and air bubbles inside the aperture tube are removed using the "flush aperture" function of the analysis software.

(2) About 30 ml of the electrolytic aqueous solution is placed into a 100 ml flat-bottomed glass beaker, and about 0.3 ml of a diluted solution as a dispersant is added thereto, the diluted solution being prepared by diluting "CONTAMINON N" (nonionic surfactant, a 10% by mass aqueous solution of a neutral detergent (pH: 7) for washing a precise measurement apparatus, which contains an anionic surfactant and an organic builder, available from Wako Pure Chemical Industries, Ltd.) 3 times by mass with deionized water.

(3) A predetermined amount of deionized water is placed into a water bath of an ultrasonic disperser "Ultrasonic Dispension System Tetora150" (available from Nikkaki Bios Co., Ltd.) having an electrical output of 120 W and including two built-in oscillators having an oscillation frequency of 50 kHz and having phases shifted by 180 degrees, and about 2 ml of the CONTAMINON N is added to the water bath.

(4) The beaker of (2) is set in the beaker fixing hole of the ultrasonic disperser to activate the ultrasonic disperser. Thereafter, the height position of the beaker is adjusted such that the solution surface of the electrolytic aqueous solution in the beaker is in the maximum resonant state.

(5) About 10 mg of the toner is added in small portions to the electrolytic aqueous solution and is dispersed, while the electrolytic aqueous solution of (4) in the beaker is irradiated with ultrasonic waves. The ultrasonic dispersion is further continued for 60 seconds. During the ultrasonic dispersion, the temperature of the water in the water bath is appropriately adjusted to 10° C. or more and 40° C. or less.

(6) The electrolyte aqueous solution of (5) having the dispersed toner is added dropwise to the round-bottomed beaker of (1) set in the sample stand using a pipette to adjust the measurement concentration to about 5%. Measurement is then performed until the number of particles measured reaches 50000 particles.

(7) The measured data is analyzed with the dedicated software attached to the apparatus to calculate the weight average particle diameter (D4). The "average diameter" in the analysis/weight statistical value (arithmetic average) screen where graph/% by weight is set by the dedicated software is defined as the weight average particle diameter (D4).

<Method of Measuring X-Ray Diffraction>

X-ray diffractometry is performed using a measurement apparatus "RINT-TTRII" (available from Rigaku Corporation) and control software and analysis software attached to the apparatus.

The measurement condition is as follows.

X-ray: Cu/50 kV/300 mA goniometer: rotor horizontal goniometer (TTR-2)

attachment: standard sample holder divergence slit: opened divergence vertical restriction slit: 10.00 mm scattering slit: opened light receiving slit: opened counter: scintillation counter scan mode: continuous scan speed: 4.0000°/min.

sampling width: 0.0200° scan axis: 2θ/θ scan range: 10.0000° to 40.0000°

Subsequently, the toner particles are set on a sample plate to start measurement.

In CuKα characteristic X-ray, an X-ray diffraction spectrum is obtained where the Bragg angle is defined as θ, the diffraction angle is defined as 2θ, 2θ is in the range of 3° or more and 35° or less, the diffraction angle 2θ is plotted in the abscissa and the X-ray strength is plotted in the ordinate.

<Preparation of Calcium Carbonate Particle>

Details of calcium carbonate used in Examples and Comparative Examples are shown in Table 1. The aspect ratio and the long diameter shown in Table 1 were determined from an image of the calcium carbonate particle alone as a raw material, which was obtained from observation of the calcium carbonate particle with a transmission electron microscope.

TABLE 1

| | | | Calcium carbonate particle | |
|---|---|---|---|---|
| | | | Aspect ratio | Number average particle diameter of long diameter [nm] |
| Calcium carbonate particle 1 (Cl) | SOCAL P3 | Imerys Minerals S.A. | 10 | 400 |
| Calcium carbonate particle 2 (C2) | Softon 3200 | Shiraishi Kogyo Kaisha, Ltd. | 1.5 | 700 |
| Calcium carbonate particle 3 (C3) | ImerSeal 96S | Imerys Minerals S.A. | 9.5 | 400 |
| Calcium carbonate particle 4 (C4) | Light calcium carbonate | Maruo Calcium Co., Ltd. | 14 | 2000 |
| Calcium carbonate particle 5 (C5) | Brilliant 15 | Shiraishi Kogyo Kaisha, Ltd. | 5.0 | 150 |
| Calcium carbonate particle 6 (C6) | Vigot 15 | Shiraishi Kogyo Kaisha, Ltd. | 6.0 | 150 |
| Calcium carbonate particle 7 (C7) | SOCAL P3 | Imerys Minerals S.A. | 3.0 | 250 |

<Production Example of Disintegrated Calcium Carbonate Particle 7>

Diethylene glycol (DEG) and sodium chloride were kneaded at 40° C. with a planetary kneader (TX-15, available from INOUE MFG., INC.). The kneaded product was placed into a mixing vessel with a stirrer which contained calcium carbonate particles 7 shown in Table 1 above. Deionized water was added, and diethylene glycol and sodium chloride were dissolved in water by stirring. The solid content was then filtered, was sufficiently washed with deionized water, and was dried in vacuum at 40° C. for 24 hours to give disintegrated calcium carbonate particles 7. Details of the resulting disintegrated calcium carbonate particles are shown in Table 2. The aspect ratio and the long diameter shown in Table 2 were determined from an image of the calcium carbonate particles alone observed with a transmission electron microscope.

This disintegrated calcium carbonate particles 7 were used in production of a toner 20.

TABLE 2

| | | | Calcium carbonate particle | |
|---|---|---|---|---|
| | | | Aspect ratio | Number average particle diameter of long diameter [nm] |
| Disintegrated calcium carbonate particle 7 (C7) | SOCAL P3 | Imerys Minerals S.A. | 3.0 | 300 |

<Production Example of Calcium Carbonate Particle Dispersed Product 1>

| | |
|---|---|
| pigment<br>(cyan pigment: Pigment Blue 15:3, weight average particle diameter; 102 nm) | 30.4 parts by mass |
| calcium carbonate particle 1 (C1)<br>(light calcium carbonate SOCAL P3, number average particle diameter: 0.4 μm) | 21.6 parts by mass |
| binder resin<br>(amorphous polyester A1: composition (mol ratio) [polyoxypropylene(2.2)-2,2-bis(4-hydroxyphenyl) propane:isophthalic acid:terephthalic acid = 100:50:50], softening temperature (Tm) = 122° C., glass transition temperature (Tg) = 70° C., SP value = 22.6 $(J/cm^3)^{0.5}$) | 48.0 parts by mass |

The materials above were mixed with a Henschel mixer (FM-75, available from Mitsui Mining Co., Ltd.) at a number of rotations of 20 $s^{-1}$ for a rotation time of 5 minutes, and then was kneaded at 120° C. with a twin-screw kneader (PCM-30, available from Ikegai Corp.) (step 1). The resulting kneaded product was cooled, and was roughly crushed into a weight average particle diameter of 100 μm or less with a pin mill to prepare a crushed product of the pigment dispersion 1. The amorphous polyester A1 had a melt viscosity at 120° C. of 2080 Pa·sec. The pigment in the resulting pigment dispersion had a number average particle diameter of 55 nm.

<Production Examples of Calcium Carbonate Particle Dispersed Products 2 to 13 and 15 to 29>

Crushed products of calcium carbonate particle dispersed products 2 to 13 and 15 to 29 were prepared in the same manner as in Production Example of the calcium carbonate particle dispersed product 1 except that the blending ratio of the binder resin, the calcium carbonate particle, and the pigment were adjusted as in Table 3. In Table 3, Mr represents the blending ratio of the binder resin, Mi represents the blending ratio of the calcium carbonate particle, and Mp represents the blending ratio of pigment particle.

TABLE 3

| Calcium carbonate particle dispersed product | Formula: Binder resin Type | Formula: Binder resin Mr [% by mass] | Formula: Calcium carbonate Type | Formula: Calcium carbonate Mi [% by mass] | Formula: Mi/Mr | Formula: Pigment Type | Formula: Pigment Mp | Production method: Apparatus | Production method: Circumferential speed [mm/s] |
|---|---|---|---|---|---|---|---|---|---|
| Calcium carbonate particle dispersed product 1 | A1 | 48 | C1 | 22 | 0.45 | Pigment Blue 15:3 | 30 | Twin-screw extruder | 314 |
| Calcium carbonate particle dispersed product 2 | A1 | 65 | C1 | 29 | 0.45 | Pigment Blue 15:3 | 5.9 | Twin-screw extruder | 314 |
| Calcium carbonate particle dispersed product 3 | A1 | 45 | C1 | 18 | 0.40 | Pigment Blue 15:3 | 37 | Twin-screw extruder | 314 |
| Calcium carbonate particle dispersed product 4 | A1 | 65 | C1 | 29 | 0.45 | Pigment Blue 15:3 | 5.5 | Twin-screw extruder | 314 |
| Calcium carbonate particle dispersed product 5 | A1 | 25 | C1 | 11 | 0.45 | Pigment Blue 15:3 | 64 | Twin-screw extruder | 314 |
| Calcium carbonate particle dispersed product 6 | A1 | 68 | C1 | 13 | 0.19 | Pigment Blue 15:3 | 19 | Twin-screw extruder | 314 |
| Calcium carbonate particle dispersed product 7 | A1 | 40 | C1 | 52 | 1.3 | Pigment Blue 15:3 | 8.4 | Twin-screw extruder | 314 |
| Calcium carbonate particle dispersed product 8 | A1 | 70 | C1 | 12 | 0.17 | Pigment Blue 15:3 | 18 | Twin-screw extruder | 314 |
| Calcium carbonate particle dispersed product 9 | A1 | 30 | C1 | 49 | 1.6 | Pigment Blue 15:3 | 21 | Twin-screw extruder | 314 |
| Calcium carbonate particle dispersed product 10 | A1 | 16 | C1 | 6 | 0.39 | Pigment Blue 15:3 | 78 | Twin-screw extruder | 314 |
| Calcium carbonate particle dispersed product 11 | A1 | 74 | C1 | 18 | 0.24 | Pigment Blue 15:3 | 8.4 | Twin-screw extruder | 314 |
| Calcium carbonate particle dispersed product 12 | A1 | 14 | C1 | 8 | 0.59 | Pigment Blue 15:3 | 78 | Twin-screw extruder | 314 |
| Calcium carbonate particle dispersed product 13 | A1 | 77 | C1 | 16 | 0.21 | Pigment Blue 15:3 | 6.8 | Twin-screw extruder | 314 |
| Calcium carbonate particle dispersed product 14 | A1 | 48 | C1 | 22 | 0.45 | Pigment Blue 15:3 | 30 | Planetary kneader | 314 |
| Calcium carbonate particle dispersed product 15 | A1 | 48 | C2 | 22 | 0.45 | Pigment Blue 15:3 | 30 | Twin-screw extruder | 314 |
| Calcium carbonate particle dispersed product 16 | A1 | 48 | C3 | 22 | 0.45 | Pigment Blue 15:3 | 30 | Twin-screw extruder | 314 |
| Calcium carbonate particle dispersed product 17 | A1 | 48 | C4 | 22 | 0.45 | Pigment Blue 15:3 | 30 | Twin-screw extruder | 314 |
| Calcium carbonate particle dispersed product 18 | A1 | 48 | C5 | 22 | 0.45 | Pigment Blue 15:3 | 30 | Twin-screw extruder | 314 |
| Calcium carbonate particle dispersed product 19 | A1 | 48 | C6 | 22 | 0.45 | Pigment Blue 15:3 | 30 | Twin-screw extruder | 314 |
| Calcium carbonate particle dispersed product 20 | A1 | 60 | — | — | — | Pigment Blue 15:3 | 40 | Twin-screw extruder | 314 |
| Calcium carbonate particle dispersed product 21 | A1 | 85 | C1 | 7 | 0.077 | Pigment Blue 15:3 | 8.4 | Twin-screw extruder | 314 |
| Calcium carbonate particle dispersed product 22 | A1 | 27 | C1 | 66 | 2.5 | Pigment Blue 15:3 | 6.8 | Twin-screw extruder | 314 |

TABLE 3-continued

| Calcium carbonate particle dispersed product | Formula: Binder resin Type | Binder resin Mr [% by mass] | Calcium carbonate Type | Calcium carbonate Mi [% by mass] | Mi/Mr | Pigment Type | Pigment Mp | Production method: Apparatus | Circumferential speed [mm/s] |
|---|---|---|---|---|---|---|---|---|---|
| Calcium carbonate particle dispersed product 23 | A1 | 75 | C1 | 9 | 0.12 | Pigment Blue 15:3 | 16 | Twin-screw extruder | 314 |
| Calcium carbonate particle dispersed product 24 | A1 | 44 | C1 | 51 | 1.2 | Pigment Blue 15:3 | 4.9 | Twin-screw extruder | 314 |
| Calcium carbonate particle dispersed product 25 | A1 | 60 | — | — | — | Pigment Blue 15:3 | 40 | Twin-screw extruder | 314 |
| Calcium carbonate particle dispersed product 26 | A1 | 80 | C1 | 3.7 | 0.047 | Pigment Blue 15:3 | 16 | Twin-screw extruder | 314 |
| Calcium carbonate particle dispersed product 27 | A1 | 60 | — | — | — | Pigment Blue 15:3 | 40 | Twin-screw extruder | 314 |
| Calcium carbonate particle dispersed product 28 | A1 | 60 | — | — | — | Pigment Blue 15:3 | 40 | Twin-screw extruder | 314 |
| Calcium carbonate particle dispersed product 29 | A1 | 48 | C1 | 22 | 0.45 | Pigment Blue 15:3 | 30 | Twin-screw extruder | 47.1 |

<Production Example of Calcium Carbonate Particle Dispersed Product 14>

The blending ratio of the binder resin, the calcium carbonate particle, and the pigment were the same as that of the calcium carbonate particle dispersed product 1. These materials were kneaded at 150° C. with a planetary kneader (TX-15, available from INOUE MFG., INC.). The resulting kneaded product was cooled, and was roughly crushed into a weight average particle diameter of 100 μm or less with a pin mill to give a crushed product of the calcium carbonate particle dispersed product 14.

<Production Example of Toner 1>

| | |
|---|---|
| amorphous polyester A1 (composition (mol ratio) [polyoxypropylene(2.2)-2,2-bis(4-hydroxyphenyl)propane:isophthalic acid:terephthalic acid = 100:50:50], softening temperature (Tm) = 122° C., glass transition temperature (Tg) = 70° C., SP value = 22.6 $(J/cm^3)^{0.5}$) | 80.0 parts by mass |
| calcium carbonate particle dispersed product 1 | 11.5 parts by mass |
| synthetic wax (hydrocarbon wax, peak temperature of maximum endothermic peak: 90° C.) | 8.0 parts by mass |

These materials above were mixed at a number of rotations of 20 $s^{-1}$ for a rotation time of 5 minutes with a Henschel mixer (FM-75, available from Mitsui Mining Co., Ltd.), and then was kneaded with a twin-screw kneader (PCM-30, available from Ikegai Corp.) (step 2). The resulting kneaded product was cooled, and was roughly crushed into a weight average particle diameter of 100 μm or less with a pin mill to give a crushed product. The resulting crushed product was pulverized into the target particle diameter with a mechanical mill (T-250, available from FREUND-TURBO CORPORATION) while the number of rotations and the number of passes were adjusted. Furthermore, classification was performed using a rotary classifier (200TSP, available from Hosokawa Micron Corporation) to give toner particles. For the operational conditions for the rotary classifier (200TSP, available from Hosokawa Micron Corporation), classification was performed by adjusting the number of rotations to provide the target particle diameter and grain size distribution. 1.8 parts by mass of silica fine particles having a specific surface area of 200 $m^2/g$, which was measured by the BET method, and subjected to a hydrophobization treatment with silicone oil was added to 100 parts by mass of the resulting toner particles, followed by mixing with a Henschel mixer (FM-75, available from Mitsui Mining Co., Ltd.) at a number of rotations of 30 $s^{-1}$, for a rotation time of 10 minutes to give a toner 1. The toner had a weight average particle diameter (D4) of 6.5 μm.

<Production Examples of Toners 2 to 19 and 21 to 24, Comparative Toners 2 and 4 to 5>

Toners 2 to 19 and 21 to 24 and Comparative toners 2 and 4 to 5 were prepared in the same manner as in Production Example of the toner 1 except that the conditions for the binder resin, the crystalline polyester, and the calcium carbonate particle in Production Example of the toner 1 were varied as in Table 4.

TABLE 4

| | Calcium carbonate particle dispersed product Type | Calcium carbonate particle dispersed product Parts | Binder resin added Type | Binder resin added Parts | Calcium carbonate Type | Calcium carbonate Parts | Crystalline polyester Parts | Wax Parts | Kneader Twin-screw extruder |
|---|---|---|---|---|---|---|---|---|---|
| Toner 1 | Calcium carbonate particle dispersed product 1 | 11.5 | A1 | 80.0 | — | — | 0.50 | 8.0 | Twin-screw extruder |

TABLE 4-continued

| | Calcium carbonate particle dispersed product | | Binder resin added | | Calcium carbonate | | Crystalline polyester | Wax | Kneader Twin-screw |
|---|---|---|---|---|---|---|---|---|---|
| | Type | Parts | Type | Parts | Type | Parts | Parts | Parts | extruder |
| Toner 2 | Calcium carbonate particle dispersed product 2 | 59.5 | A1 | 32.0 | — | — | 0.50 | 8.0 | Twin-screw extruder |
| Toner 3 | Calcium carbonate particle dispersed product 3 | 9.50 | A1 | 82.0 | — | — | 0.50 | 8.0 | Twin-screw extruder |
| Toner 4 | Calcium carbonate particle dispersed product 4 | 63.5 | A1 | 28.0 | — | — | 0.50 | 8.0 | Twin-screw extruder |
| Toner 5 | Calcium carbonate particle dispersed product 5 | 5.50 | A1 | 86.0 | — | — | 0.50 | 8.0 | Twin-screw extruder |
| Toner 6 | Calcium carbonate particle dispersed product 6 | 18.5 | A1 | 73.0 | — | — | 0.50 | 8.0 | Twin-screw extruder |
| Toner 7 | Calcium carbonate particle dispersed product 7 | 41.5 | A1 | 50.0 | — | — | 0.50 | 8.0 | Twin-screw extruder |
| Toner 8 | Calcium carbonate particle dispersed product 8 | 19.0 | A1 | 72.5 | — | — | 0.50 | 8.0 | Twin-screw extruder |
| Toner 9 | Calcium carbonate particle dispersed product 9 | 16.5 | A1 | 75.0 | — | — | 0.50 | 8.0 | Twin-screw extruder |
| Toner 10 | Calcium carbonate particle dispersed product 10 | 4.50 | A1 | 87.0 | — | — | 0.50 | 8.0 | Twin-screw extruder |
| Toner 11 | Calcium carbonate particle dispersed product 11 | 41.5 | A1 | 50.0 | — | — | 0.50 | 8.0 | Twin-screw extruder |
| Toner 12 | Calcium carbonate particle dispersed product 12 | 4.50 | A1 | 87.0 | — | — | 0.50 | 8.0 | Twin-screw extruder |
| Toner 13 | Calcium carbonate particle dispersed product 13 | 51.5 | A1 | 40.0 | — | — | 0.50 | 8.0 | Twin-screw extruder |
| Toner 14 | Calcium carbonate particle dispersed product 14 | 11.5 | A1 | 80.0 | — | — | 0.50 | 8.0 | Twin-screw extruder |
| Toner 15 | Calcium carbonate particle dispersed product 15 | 11.5 | A1 | 80.0 | — | — | 0.50 | 8.0 | Twin-screw extruder |
| Toner 16 | Calcium carbonate particle dispersed product 16 | 11.5 | A1 | 80.0 | — | — | 0.50 | 8.0 | Twin-screw extruder |
| Toner 17 | Calcium carbonate particle dispersed product 17 | 11.5 | A1 | 80.0 | — | — | 0.50 | 8.0 | Twin-screw extruder |
| Toner 18 | Calcium carbonate particle dispersed product 18 | 11.5 | A1 | 80.0 | — | — | 0.50 | 8.0 | Twin-screw extruder |
| Toner 19 | Calcium carbonate particle dispersed product 19 | 11.5 | A1 | 80.0 | — | — | 0.50 | 8.0 | Twin-screw extruder |
| Toner 20 | Calcium carbonate particle dispersed product 20 | 8.75 | A1 | 82.8 | C7 | 4.31 | 0.50 | 8.0 | Twin-screw extruder |
| Toner 21 | Calcium carbonate particle dispersed product 21 | 41.5 | A1 | 50.0 | — | — | 0.50 | 8.0 | Twin-screw extruder |
| Toner 22 | Calcium carbonate particle dispersed product 22 | 51.5 | A1 | 40.0 | — | — | 0.50 | 8.0 | Twin-screw extruder |
| Toner 23 | Calcium carbonate particle dispersed product 23 | 21.5 | A1 | 70.0 | — | — | 0.50 | 8.0 | Twin-screw extruder |
| Toner 24 | Calcium carbonate particle dispersed product 24 | 71.5 | A1 | 20.0 | — | — | 0.50 | 8.0 | Twin-screw extruder |
| Comparative toner 1 | Calcium carbonate particle dispersed product 25 | 8.75 | A1 | 82.8 | C1 | 4.31 | 0.50 | 8.0 | Twin-screw extruder |
| Comparative toner 2 | Calcium carbonate particle dispersed product 26 | 21.5 | A1 | 70.0 | — | — | 0.50 | 8.0 | Twin-screw extruder |

TABLE 4-continued

| | Calcium carbonate particle dispersed product | | Binder resin added | | Calcium carbonate | | Crystalline polyester | Wax | Kneader Twin-screw |
|---|---|---|---|---|---|---|---|---|---|
| | Type | Parts | Type | Parts | Type | Parts | Parts | Parts | extruder |
| Comparative toner 3 | Calcium carbonate particle dispersed product 27 | 8.75 | A1 | 82.8 | C5 | 4.31 | 0.50 | 8.0 | Twin-screw extruder |
| Comparative toner 4 | Calcium carbonate particle dispersed product 28 | 8.75 | A1 | 82.8 | — | — | 0.50 | 8.0 | Twin-screw extruder |
| Comparative toner 5 | Calcium carbonate particle dispersed product 29 | 11.5 | A1 | 80.0 | — | — | 0.50 | 8.0 | Twin-screw extruder |

<Production Example of Toner 20>

| | |
|---|---|
| amorphous polyester A1 (composition (mol ratio) [polyoxypropylene(2.2)-2,2-bis(4-hydroxyphenyl)propane:isophthalic acid:terephthalic acid = 100:50:50], softening temperature (Tm) = 122° C., glass transition temperature (Tg) = 70° C., SP value = 22.6 $(J/cm^3)^{0.5}$) | 82.8 parts by mass |
| disintegrated calcium carbonate particle C7 | 4.31 parts by mass |
| crystalline polyester | 0.50 parts by mass |
| synthetic wax i (hydrocarbon wax, peak temperature of maximum endothermic peak: 90° C.) | 8.0 parts by mass |

These materials above were mixed with a Henschel mixer (FM-75, available from Mitsui Mining Co., Ltd.) at a number of rotations of 20 $s^{-1}$ for a rotation time of 5 minutes, and then was kneaded with a twin-screw kneader (PCM-30, available from Ikegai Corp.). The resulting kneaded product was cooled, and was roughly crushed into a weight average particle diameter of 100 μm or less with a pin mill to give a crushed product. The resulting crushed product was pulverized with a mechanical mill (T-250, available from FREUND-TURBO CORPORATION) while the number of rotations and the number of passes were adjusted. Furthermore, classification was performed using a rotary classifier (200TSP, available from Hosokawa Micron Corporation) to give toner particles. For the operational conditions for the rotary classifier (200TSP, available from Hosokawa Micron Corporation), classification was performed by adjusting the number of rotations to provide the target particle diameter and grain size distribution. 1.8 parts by mass of silica fine particles having a specific surface area of 200 $m^2/g$, which was measured by the BET method, and subjected to a hydrophobization treatment with silicone oil was added to 100 parts by mass of the resulting toner particles, followed by mixing with a Henschel mixer (FM-75, available from Mitsui Mining Co., Ltd.) at a number of rotations of 30 $s^{1}$, for a rotation time of 10 minutes to give a toner 20.

<Production Examples of Comparative Toners 1 and 3>

Comparative toners 1 and 3 were prepared in the same manner as in Production Example of the toner 20 except that the conditions for the binder resin, the crystalline polyester, and the calcium carbonate particle added in Production Example of the toner 20 were varied as in Table 4.

The calcium carbonate particle in the toners 1 to 24 and Comparative toners 1 to 5 were evaluated for crystallinity. The results of analysis of the toners are shown in Table 5.

TABLE 5

| | Calcium carbonate particle | | | | Toner |
|---|---|---|---|---|---|
| Toner name | Content (% by mass) | Crystallite diameter [nm] | Ratio of peak intensity | Aspect ratio | Particle diameter [μm] |
| Toner 1 | 4.3 | 30 | 0.17 | 4 | 6.5 |
| Toner 2 | 20 | 33 | 0.17 | 4 | 6.5 |
| Toner 3 | 3.3 | 39 | 0.17 | 4 | 6.5 |
| Toner 4 | 21 | 34 | 0.17 | 4 | 6.5 |
| Toner 5 | 1.6 | 35 | 0.17 | 4 | 6.5 |
| Toner 6 | 3.5 | 42 | 0.16 | 4 | 6.5 |
| Toner 7 | 26 | 25 | 0.19 | 4 | 6.5 |
| Toner 8 | 3.2 | 43 | 0.16 | 4 | 6.5 |
| Toner 9 | 12 | 22 | 0.22 | 4 | 6.5 |
| Toner 10 | 0.81 | 36 | 0.22 | 4 | 6.5 |
| Toner 11 | 8.8 | 42 | 0.17 | 4 | 6.5 |
| Toner 12 | 1.1 | 28 | 0.23 | 4 | 6.5 |
| Toner 13 | 9.7 | 44 | 0.16 | 4 | 6.5 |
| Toner 14 | 4.3 | 36 | 0.16 | 4 | 6.5 |
| Toner 15 | 4.3 | 24.5 | 0.19 | 5 | 6.5 |
| Toner 16 | 4.3 | 22.2 | 0.19 | 4 | 6.5 |
| Toner 17 | 4.3 | 25 | 0.23 | 6 | 6.5 |
| Toner 18 | 4.3 | 27.9 | 0.19 | 2 | 6.5 |
| Toner 19 | 4.3 | 40.8 | 0.17 | 10 | 6.5 |
| Toner 20 | 4.3 | 33 | 0.16 | 5 | 6.5 |
| Toner 21 | 3.3 | 44.5 | 0.15 | 4 | 6.5 |
| Toner 22 | 40 | 14 | 0.24 | 4 | 6.5 |
| Toner 23 | 2.6 | 44.2 | 0.16 | 4 | 6.5 |
| Toner 24 | 41 | 30 | 0.22 | 4 | 6.5 |
| Comparative toner 1 | 4.3 | 37.5 | 0.14 | 4 | 6.5 |
| Comparative toner 2 | 1.1 | 48 | 0.16 | 4 | 6.5 |
| Comparative toner 3 | 4.3 | 52 | 0.13 | 4 | 6.5 |
| Comparative toner 4 | 0 | — | — | — | 6.5 |
| Comparative toner 5 | 4.3 | 51 | 0.13 | 6.2 | 6.5 |

<Production Example of Magnetic Core Particle 1>

Step 1 (Weighing and Mixing Step):

| | |
|---|---|
| $Fe_2O_3$ | 62.7 parts |
| $MnCO_3$ | 29.5 parts |
| $Mg(OH)_2$ | 6.8 parts |
| $SrCO_3$ | 1.0 part |

The ferrite raw material was weighed to achieve the above compositional ratio of these materials. Subsequently, the materials were pulverized and mixed for 5 hours with a dry vibration mill using stainless steel beads having a diameter of ⅛ inches.

Step 2 (Calcination Step):

The resulting pulverized product was formed into pellets of about 1 mm square with a roller compactor. The pellets were passed through a vibration sieve having an opening of 3 mm to remove rough powder, and then through a vibration sieve having an opening of 0.5 mm to remove fine powder, and was fired in a burner-type firing furnace under a nitrogen atmosphere (oxygen concentration: 0.01% by volume) at a temperature of 1000° C. for 4 hours to prepare calcined ferrite. The resulting calcined ferrite has the following composition.

$$(MnO)_a(MgO)_b(SrO)_c(Fe_2O_3)_d$$

In the formula, a=0.257, b=0.117, c=0.007, and d=0.393

Step 3 (Pulverizing Step):

The resulting calcined ferrite was pulverized into about 0.3 mm with a crusher, and then 30 parts of water was added to 100 parts of the calcined ferrite, followed by pulverization with a wet ball mill for 1 hour using zirconia beads having a diameter of ⅛ inches. The resulting slurry was pulverized with a wet ball mill for 4 hours using alumina beads having a diameter of 1/16 inches to prepare a ferrite slurry (pulverized product of the calcined ferrite).

Step 4 (Granulation Step):

1.0 part of ammonium polycarboxylate as a dispersant and 2.0 parts of poly(vinyl alcohol) as a binder relative to 100 parts of the calcined ferrite were added to the ferrite slurry, and the slurry was granulated into spherical particles with a spray dryer (available from OHKAWARA KAKOHKI CO., LTD.). The particle size of the resulting particles was adjusted, and heated at 650° C. for 2 hours with a rotary kiln to remove organic components in the dispersant and the binder.

Step 5 (Firing Step):

To control the firing atmosphere, in an electric furnace, the product was fired under a nitrogen atmosphere (oxygen concentration: 1.00% by volume) while heating from room temperature to a temperature of 1300° C. in 2 hours, and then was fired at a temperature of 1150° C. for 4 hours. Subsequently, the product was cooled to a temperature of 60° C. over 4 hours, was transferred from the nitrogen atmosphere to the air, and was extracted at a temperature of 40° C. or less.

Step 6 (Separation Step):

After aggregated particles were disintegrated, a low magnetic product was removed by magnetic separation. The resulting product was sieved with a sieve having an opening of 250 μm to remove coarse particles to give magnetic core particles 1 having a 50% particle diameter (D50) of 37.0 μm based on volume distribution.

<Preparation of Coating Resin 1>

| | |
|---|---|
| cyclohexyl methacrylate monomer | 26.8% by mass |
| methyl methacrylate monomer | 0.2% by mass |
| methyl methacrylate macromonomer (macromonomer having a methacryloyl group at one terminal and having a weight average molecular weight of 5000) | 8.4% by mass |
| toluene | 31.3% by mass |
| methyl ethyl ketone | 31.3% by mass |
| azobisisobutyronitrile | 2.0% by mass |

Of the materials, the cyclohexyl methacrylate monomer, the methyl methacrylate monomer, the methyl methacrylate macromonomer, toluene, and methyl ethyl ketone were placed into a four-necked separable flask provided with a reflux cooler, a thermometer, a nitrogen inlet pipe, and a stirrer, and nitrogen gas was sufficiently introduced to provide a nitrogen atmosphere. Subsequently, the flask was heated to 80° C., and azobisisobutyronitrile was added, followed by polymerization while refluxing for 5 hours. Hexane was injected into the resulting reaction product to precipitate the copolymer. The precipitate was separated through filtration, and was dried in vacuum to give a coating resin 1.

<Preparation of Coating Resin Solution 1>

33.3% by mass of the polymer solution 1 prepared by dissolving 30 parts of the coating resin 1 in 40 parts of toluene and 30 parts of methyl ethyl ketone (resin solid content concentration: 30%), 66.4% by mass of toluene, and 0.3% by mass of carbon black Regal 330 (available from Cabot Corporation) (primary particle diameter: 25 nm, nitrogen adsorption specific surface area: 94 $m^2/g$, DBP oil absorption value: 75 mL/100 g)

were dispersed for 1 hour in a paint shaker using zirconia beads having a diameter of 0.5 mm. The resulting dispersion was filtered through a 5.0 μm membrane filter to give a coating resin solution 1.

<Production Example of Magnetic Carrier 1>

(Resin Coating Step):

The magnetic core particle 1 and the coating resin solution 1 were placed into a vacuum degassing kneader kept at normal temperature (the coating resin solution 1 was placed in an amount such that the amount in terms of the resin component was 2.5 parts relative to 100 parts of the magnetic core particle 1). After placed thereinto, these were stirred at a rotational speed of 30 rpm for 15 minutes. After a predetermined (80% by mass) or larger amount of the solvent volatilized, these materials were heated to 80° C. while being mixed under reduced pressure. Toluene was distilled away over 2 hours, and the product was then cooled. The resulting magnetic carrier was separated by magnetic separation to remove a low magnetic product, was passed through a sieve having an opening of 70 μm, and was classified with an air force classifier to give a magnetic carrier 1 having a 50% particle diameter (D50) of 38.2 μm based on volume distribution.

<Production of Two-Component Developer 1>

8.0 parts of toner 1 was added to 92.0 parts of the magnetic carrier 1, and was mixed therewith with a V-type mixer (V-20, available from Seishin Enterprise Co., Ltd.) to give a two-component developer 1.

<Production of Two-Component Developers 2 to 24 and Comparative Two-Developers 1 to 5>

Two-component developers 2 to 24 and Comparative two-component Developers 1 to 5 were obtained through the same operation as that in Production Example of the two-component developer 1 except that the toner used in combination was varied among the toners 2 to 24 and Comparative toners 1 to 5.

The image forming apparatus used was a modified machine of a printer for digital commercial printing, image RUNNER ADVANCE C9075 PRO, available from Canon Inc., and the two-component developer was charged into the developing unit for the cyan position. The DC voltage $V_{DC}$ of the developer carrier, the charging voltage VD of the electrostatic latent image carrier, and the laser power were adjusted such that the amount of the toner applied onto the electrostatic latent image carrier or paper was desired, and evaluation described later was performed. The printer was modified such that the fixing temperature and the process speed could be freely set.

Example 1

The two-component developer 1 was evaluated for rub resistance and low-temperature fixing properties by the following method.

Test Example 1: Evaluation of Rub Resistance paper: OK Top Coat+, available from Oji Paper Company, 127 g/m$^2$ image for evaluation: halftone image (image density: 0.20 or more and 0.25 or less)

The image density was measured with a "Macbeth reflection densitometer RD918" (available from Gretag Macbeth GmbH) according to the instruction manual attached thereto, that is, the relative density was measured to an image density of 0.00 corresponding to a white solid portion of an image. The resulting relative density was defined as an image density value.

A rub resistance test was performed as follows: A sheet of paper (OK Top Coat+, available from Oji Paper Company, 127 g/m$^2$) was disposed on the image sample and a weight of 500 g was placed thereon such that the contact area was 12.6 cm$^2$, and then the sheet was rubbed with the weight 10 times. Subsequently, the toner adhering within the region of 12.6 cm$^2$ of the sheet of paper (inside the region in which the weight was placed) was measured with a fogging meter, and the determined fogging value was evaluated according to the following criteria. The results of evaluation are shown in Table 6.

[Criteria for Evaluation]

Rank A: fogging of 2% or less

Rank B: fogging of 2% or more and less than 5%

Rank C: fogging of 5% or more and less than 10%

Rank D: fogging of 10% or more

Test Example 2: Evaluation of Low-Temperature Fixing Properties

Paper: CF-C104 (104.0 g/m$^2$)

(commercially available from Canon Marketing Japan Inc.)

amount of toner applied onto paper: 0.90 mg/cm$^2$ image for evaluation: an image of 25 cm$^2$ disposed in the center of a sheet of paper of size A4 described above environment for the fixing test: environment at low temperature and low humidity: temperature: 15° C./humidity: 10% RH (hereinafter, referred to as "L/L")

The DC voltage VDC of the developer carrier, charging voltage VD of the electrostatic latent image carrier, and the laser power were adjusted such that the amount of the toner applied onto paper above was provided. Thereafter, the process speed was set to 300 mm/sec, and the fixing temperature was set to 130° C. to evaluate the low-temperature fixing properties. The value of the image density reduction rate was used as an index for evaluating the low-temperature fixing properties. The image density reduction rate was determined as follows: first, the image density of a central portion was measured with an X-Rite color reflection densitometer (500 series: available from X-Rite, Incorporated). Next, while a load of 4.9 kPa (50 g/cm$^2$) was applied to the portion where the image density was measured, the fixed image was rubbed with a lens-cleaning paper (5 round trips), and the image density was again measured. Thereafter, the reduction rate (%) of the image density before and after rubbing was measured. The results of evaluation are shown in Table 6.

The criteria for evaluation were specified as follows.

[Criteria for Evaluation]

Rank A: density reduction rate of less than 1.0%

Rank B: density reduction rate of 1.0% or more and less than 5.0%

Rank C: density reduction rate of 5.0% or more and less than 10.0%

Rank D: density reduction rate of 10.0% or more

Examples 2 to 24 and Comparative Examples 1 to 5>

The rub resistance and the low-temperature fixing properties were evaluated as in Example 1 except that the two-component developer 1 used was replaced by the two-component developers 2 to 24 and Comparative two-component developers 1 to 5. The results of evaluation are shown in Table 6.

TABLE 6

| | Rub resistance | | Low-temperature fixing properties | |
|---|---|---|---|---|
| Example/Comparative Example | Rank | Fogging value | Rank | Density reduction rate [%] |
| Example 1 | A | 1.3 | A | 0.60 |
| Example 2 | A | 1.7 | A | 0.66 |
| Example 3 | C | 5.2 | A | 0.70 |
| Example 4 | A | 1.8 | A | 0.75 |
| Example 5 | A | 1.6 | A | 0.78 |
| Example 6 | C | 6.0 | A | 0.86 |
| Example 7 | A | 1.3 | B | 3.0 |
| Example 8 | A | 1.2 | C | 5.7 |
| Example 9 | A | 1.1 | C | 6.5 |
| Example 10 | A | 1.1 | C | 6.0 |
| Example 11 | A | 1.5 | A | 0.88 |
| Example 12 | A | 1.8 | C | 6.6 |
| Example 13 | B | 3.0 | A | 0.92 |
| Example 14 | B | 3.8 | A | 0.77 |
| Example 15 | A | 1.9 | B | 3.5 |
| Example 16 | B | 2.5 | B | 3.8 |
| Example 17 | A | 1.3 | C | 5.6 |
| Example 18 | A | 1.2 | B | 4.2 |
| Example 19 | A | 1.8 | A | 0.71 |
| Example 20 | A | 1.6 | A | 0.74 |
| Example 21 | C | 7.2 | A | 0.85 |
| Example 22 | A | 1.6 | C | 6.1 |
| Example 23 | B | 2.3 | A | 0.83 |
| Example 24 | A | 1.6 | C | 6.8 |
| Comparative Example 1 | D | 11 | A | 0.66 |
| Comparative Example 2 | D | 10 | A | 0.83 |
| Comparative Example 3 | D | 11 | A | 0.69 |
| Comparative Example 4 | D | 11 | A | 0.74 |
| Comparative Example 5 | D | 10 | A | 0.61 |

In Comparative Example 1, the toner is produced by adding calcium carbonate in the step 2. Thus, the number of steps in the (104) plane is small, and the ratio of peak intensity of 0.14 is out of the range which leads to demonstration of the effects of the present disclosure. Accordingly, it is inferred that the toner had a rub resistance not acceptable.

In Comparative Example 2, a small amount of calcium carbonate was added in the step 1. It is inferred that this resulted in a significant reduction in chances of rubbing between calcium carbonate particles in the step 1, producing a toner while keeping a large crystallite diameter. It is also inferred that the area of the toner which interacted with the resin was reduced, and the resulting toner had a rub resistance not acceptable.

In Comparative Example 3, calcium carbonate C5 is added in the step 2. The toner was produced with a small number of steps in the (104) plane and a large crystallite diameter. It is inferred that as a result, the effects of the present disclosure were not sufficiently obtained, and the resulting toner had a rub resistance not acceptable.

In Comparative Example 4, calcium carbonate particles are absent in the toner. The interaction between calcium carbonate and the resin was not obtained, reducing the toner cohesive force. It is inferred that the effects of the present disclosure were not sufficiently obtained, and the resulting toner had a rub resistance not acceptable.

In Comparative Example 5, the circumferential speed during production of the calcium carbonate particle dispersed product is low as 47.1 mm/s. For this reason, the step in the (104) plane of the calcium carbonate particles is hard to form, and the peak intensity ratio of the (104) plane to the (112) plane, which is obtained from XRD measurement, is low as 0.13. Accordingly, it is inferred that the interaction with the binder resin was weak, and the resulting toner had a rub resistance not acceptable.

Examples also include the toners having low-temperature fixing properties ranked as B and C. It is considered that this is caused by a significantly large number of steps in the (104) plane of calcium carbonate used, deteriorating the low-temperature fixing properties.

The present disclosure can provide a toner having high rub resistance in resulting images while ensuring improved low-temperature fixing properties.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-209737, filed Dec. 17, 2020, and Japanese Patent Application No. 2021-178220, filed Oct. 29, 2021, which are hereby incorporated by reference herein in their entirety.

What is claimed is:

1. A toner, comprising:

a toner particle containing a binder resin and a calcium carbonate particle, wherein the calcium carbonate particle has peaks at 2θ of 26.5°±0.5° and 29.5°±0.5° in X-ray diffractometry of the toner particle by CuKα radiation, when the Bragg angle is defined as θ, a crystallite diameter of crystals thereof attributed to 2θ=29.5°±0.5° is 10 to 45 nm, and a ratio a/b is 0.15 to 0.24 when a is a peak intensity at 2θ=26.5°±0.5° and b is a peak intensity at 2θ=29.5°±0.5°.

2. The toner according to claim 1, wherein an average aspect ratio (long axis/short axis) of the calcium carbonate particle in a cross section observed with a scanning electron microscope is 1.5 to 6.0.

3. The toner according to claim 1, wherein, the crystallite diameter of crystals is 20 to 40 nm, and a/b is 0.15 to 0.20.

4. The toner according to claim 1, wherein a content of the calcium carbonate particle is 3.0 to 40% by mass relative to the mass of the toner particle.

5. A method of producing a toner comprising a toner particle containing a binder resin and a calcium carbonate particle, wherein the calcium carbonate particle has peaks at 2θ of 26.5°±0.5° and 29.5°±0.5° in X-ray diffractometry of the toner particle by CuKα radiation, when the Bragg angle is defined as θ, a crystallite diameter of crystals thereof attributed to 2θ=29.5°±0.5° is 10 to 45 nm, and a ratio a/b is 0.15 to 0.24 when a is a peak intensity at 2θ=26.5°±0.5° and b is a peak intensity at 2θ=29.5°±0.5°, the method comprising the steps of:

(1) melt kneading a first mixture containing a portion of a binder resin and a calcium carbonate particle with a twin-screw extruder to prepare a melted mixture; and (2) melt kneading a second mixture containing the melted mixture and the residual binder resin.

6. The method of producing the toner according to claim 5, wherein $$15 \le Mr \le 75 \text{ and } 0.17 \le Mi/Mr \le 1.3$$

when Mr (% by mass) is the content of the binder resin, and Mi (% by mass) is the content of the calcium carbonate relative to the mass of the first mixture, and a content of the residual binder resin added in step 2 is 30 to 75% by mass relative to the mass of the second mixture.

7. The method of producing the toner according to claim 5, wherein a circumferential speed of an outer end of a kneading screw of the twin-screw extruder in step 1 is 78 mm/s or more.

8. The toner according to claim 1, wherein the toner particle contains a colorant, and the content of the colorant is 1 to 20 parts by mass relative to 100 parts by mass of the binder resin.

* * * * *